US012640017B2

(12) United States Patent
Shevtsov et al.

(10) Patent No.: US 12,640,017 B2
(45) Date of Patent: May 26, 2026

(54) CUSTOMER ASSISTANCE AT SELF CHECKOUTS USING COMPUTER VISION

(71) Applicant: TOSHIBA GLOBAL COMMERCE SOLUTIONS, INC., Durham, NC (US)

(72) Inventors: Evgeny Shevtsov, Plano, TX (US); Andrei Khaitas, McKinney, TX (US); Srija Ganguly, Raleigh, NC (US); Philip S. Brown, Cary, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 0 days.

(21) Appl. No.: 18/667,937

(22) Filed: May 17, 2024

(65) Prior Publication Data

US 2025/0356739 A1 Nov. 20, 2025

(51) Int. Cl.
| | |
|---|---|
| *G06Q 20/20* | (2012.01) |
| *G06F 40/20* | (2020.01) |
| *G06V 10/82* | (2022.01) |
| *G06V 20/52* | (2022.01) |
| *G06V 20/64* | (2022.01) |
| *G07G 1/01* | (2006.01) |

(52) U.S. Cl.
CPC .............. *G07G 1/01* (2013.01); *G06F 40/20* (2020.01); *G06Q 20/208* (2013.01); *G06V 10/82* (2022.01); *G06V 20/52* (2022.01); *G06V 20/64* (2022.01)

(58) Field of Classification Search
CPC ........ G07G 1/01; G06F 40/20; G06Q 20/208; G06V 10/82; G06V 20/52; G06V 20/64
See application file for complete search history.

(56) References Cited

U.S. PATENT DOCUMENTS

| | | | | |
|---|---|---|---|---|
| 11,966,900 B2 * | 4/2024 | Xiao | .................... | G07G 1/0036 |
| 12,374,139 B2 * | 7/2025 | Hu | .................... | G06V 30/19147 |
| 2009/0005343 A1 * | 1/2009 | Hecht | ................ | C08B 37/0012 |
| | | | | 514/58 |
| 2021/0027485 A1 * | 1/2021 | Zhang | ........................ | G06T 7/11 |
| 2021/0110371 A1 | 4/2021 | Garner | | |
| 2023/0056327 A1 * | 2/2023 | Brakob | ................. | G06V 20/44 |
| 2023/0161946 A1 * | 5/2023 | Bradley | .................. | G06F 16/22 |
| | | | | 715/205 |
| 2023/0245535 A1 * | 8/2023 | Xiao | ........................ | G06V 20/52 |
| | | | | 382/103 |
| 2023/0306539 A1 * | 9/2023 | Frei | ........................ | G06V 10/454 |
| 2023/0368625 A1 * | 11/2023 | Sanil | ......................... | G06T 7/10 |
| 2024/0220999 A1 * | 7/2024 | Gao | ........................ | G06V 10/25 |
| 2025/0000282 A1 * | 1/2025 | Morgan | ................. | G06Q 20/18 |

FOREIGN PATENT DOCUMENTS

| | | | | | |
|---|---|---|---|---|---|
| GB | 2593553 A | * | 9/2021 | ......... | G06F 16/5866 |

* cited by examiner

*Primary Examiner* — Tuyen K Vo
(74) *Attorney, Agent, or Firm* — Patterson + Sheridan, LLP; Gero G. McClellan

(57) ABSTRACT

Techniques relating to using machine learning (ML) with a point of sale (POS) system. These techniques include identifying one or more images, captured at a POS system, of one or more items for purchase. The techniques further include predicting a checkout issue relating to the one or more items for purchase, including determining the checkout issue using a trained ML model, based on the one or more images. The techniques further include generating one or more instructions for a purchaser of the one or more items, based on the predicted checkout issue, and presenting the one or more instructions at a user interface of the POS system.

20 Claims, 6 Drawing Sheets

CUSTOMER ASSISTANCE AT SELF CHECKOUTS USING COMPUTER VISION

BACKGROUND

The present disclosure relates to machine learning (ML), including, to computer vision. As automation with computer vision continues to increase in checkout lanes, it can sometimes be difficult for customers to follow instructions to successfully complete a transaction (e.g., to successfully complete a transaction that uses computer vision to identify items for purchase at the checkout lane). For example, a customer's interaction with the lanes or devices determines the accuracy of the checkout experience (e.g., the accuracy of computer vision outputs, predictions, or alerts).

DETAILED DESCRIPTION

Figure 1:
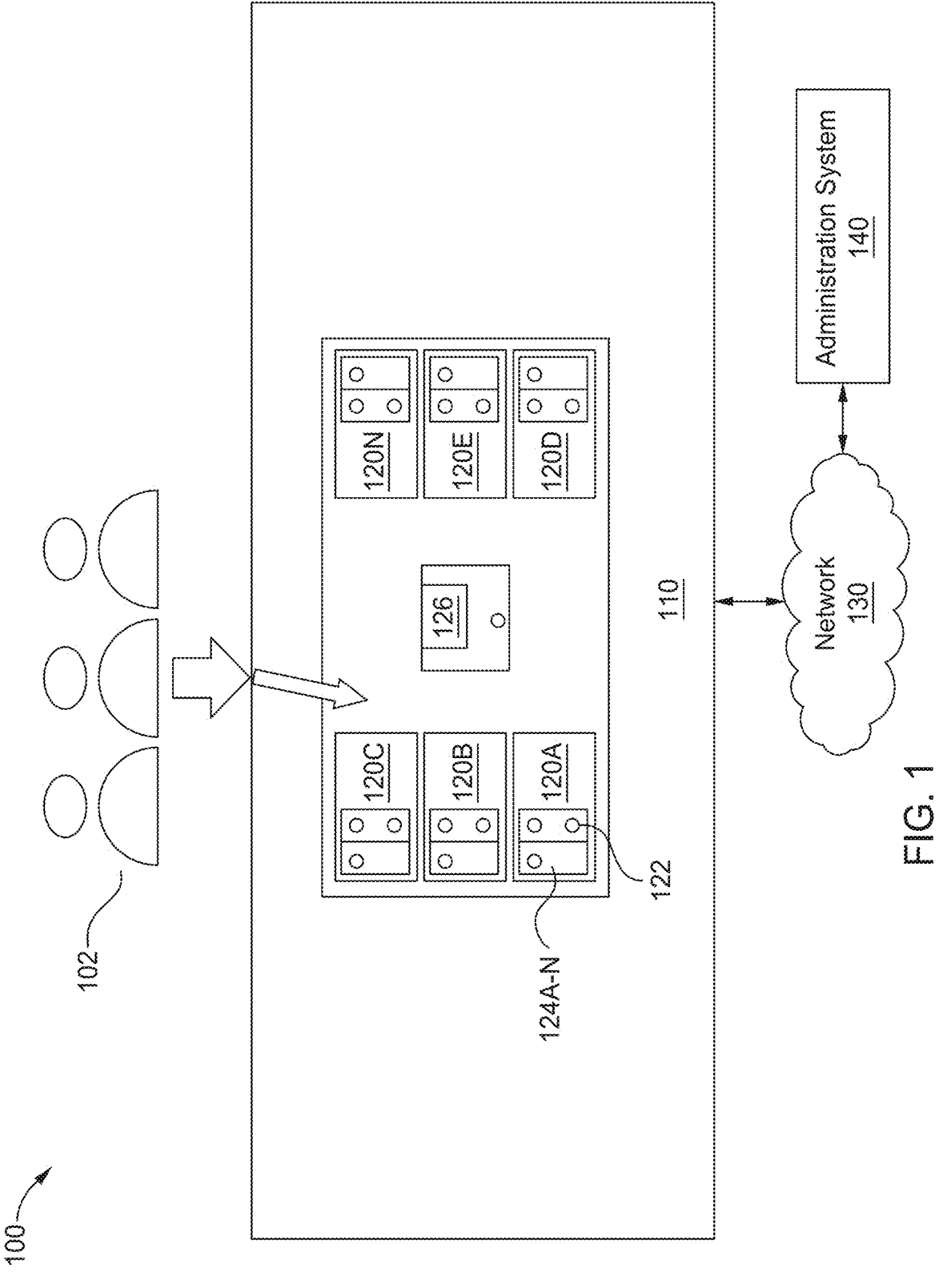
FIG. 1 illustrates an example checkout area with customer assistance using computer vision item detection, according to one embodiment.

As discussed above, customer behavior during checkout (e.g., how items are placed in a point of sale (POS) environment) can affect the accuracy of computer vision analysis and the success of checkout transactions. In an embodiment, automated aspects of the checkout experience can be improved by providing relevant instructions (e.g., audio, video, or textual messages) to customers, while the customers are using an automated checkout system. For example, the computer-vision based item detection process can be expanded to include generating instructions for customers. A computer vision component, or another suitable ML model, can consider attributes of items being purchased (e.g., their placement, shape, sizes, boundaries, and any other suitable attributes), and can use those attributes to identify potential issues with the checkout process. The system can then provide instructions to the customer to improve the transaction (e.g., instructions relating to moving items). This can effectively let the computer vision system dictate how it would prefer sensors (e.g., cameras or other image capture devices) be able to view items for purchase in order to provide accurate predictions.

In an embodiment, a customer can be provided with instantaneous (or near instantaneous) alerts on screen, when a POS system identifies a potential checkout issue, to allow the customer to address the issue. For example, assume a customer places three items for checkout in a POS system (e.g., on a scale of the POS system). Two of the items overlap, with no clearly visible boundaries (e.g., to a computer vision system), and block the third item from view. In existing systems, a computer vision system could miss out on identifying the third item (e.g., because the view is blocked to image capture devices or other sensors).

In an embodiment, the POS system can identify this potential issue (e.g., predict the issue using a suitable ML model), and can provide instructions to the customer. For example, the POS system could provide textual, audio, or video instructions to the customer, instructing the customer to move the items so that sufficient gaps are present to view the items. This can significantly improve the checkout experience, for customers (e.g., to avoid errors) and for sellers (e.g., to avoid employee intervention or losses). As discussed below, in an embodiment the POS system uses computer vision to predict checkout issues and provide customer instructions. Alternatively, or in addition, the POS system uses additional sensor data (e.g., weight data captured by a scale) in a suitable ML model to predict checkout issues.

Advantages of Customer Assistance Using Computer Vision

As discussed above, in an embodiment ML (e.g., a computer vision ML model and one or more additional suitable ML model(s)) can be used to predict checkout issues and provide instructions to customers. This has numerous technical advantages. For example, customer use of a POS system may make computer vision techniques inaccurate or insufficient to accurately predict items for purchase. As discussed further below with regard to FIG. 1, this could be because items are not sufficiently visible to image capture devices (e.g., items overlap, are occluded, are blocked, are placed too far or too near image capture devices, or any other suitable issue), because items are crumpled, spoiled, damaged, or broken, or for any other suitable reason. Providing customer instructions to address these issues can result in significantly more accurate predictions. This solves a technical problem inherent in computer vision techniques—computer vision prediction is limited to visible data—by using computer vision (or other ML techniques) to predict issues and provide instructions to cure the issues.

Further, one or more techniques discussed below can reduce the computational resources used for prediction, by reducing the resources used for computer vision item recognition. For example, fewer training resources can be used to train the computer vision ML model because the computer vision ML model does not strain to use limited data and identify items placed incorrectly in the POS system. Instead, the POS system can provide instructions to a customer to address the checkout issue, allowing the computer vision system access to more complete data in order to more easily identify items. This also avoids wasted computation (including wasted power), by avoiding repeated unsuccessful attempts to identify items. Instead, the POS system can use a suitable ML model to predict an issue and provide instructions, allowing for a successful transaction while reducing unsuccessful attempts at item recognition.

FIG. 1 illustrates an example checkout area 100 with customer assistance using computer vision item detection, according to one embodiment. In an embodiment, the checkout area 100 relates to a retail store environment (e.g., a grocery store or any other suitable retail store). This is merely one example, and the checkout area 100 can relate to any suitable environment.

One or more purchasers 102 use a checkout area 110 (e.g., to pay for purchases). In an embodiment, the checkout area 110 includes multiple point of sale (POS) systems 120A-N. For example, one of the purchasers 102 can use one of the POS systems 120A-N for self-checkout to purchase items. The checkout area 110 further includes an employee station 126. For example, an employee (e.g., a retail employee) can use the employee station 126 to monitor the purchasers 102 and the POS systems 120A-N. Self-checkout is merely one example, and the POS systems 120A-N can be any suitable systems. For example, the POS system 120A can be an assisted checkout kiosk in which an employee assists a purchaser with checkout, or the checkout area 110 can be fully purchaser focused and not include employee assistance.

In an embodiment, each of the POS systems 120A-N includes components used by the purchaser for self-checkout. For example, the POS system 120A includes a scanner 122 and one or more sensors 124A-N (e.g., image capture devices, weight sensors, pressure sensors, or any other suitable sensors). In an embodiment, the purchaser 102 can use the scanner 122 to scan a universal product code (UPC) on an item. Further, in an embodiment, the scanner 122 can be integrated with, or replaced by, one or more of the sensors 124A-N. For example, the sensors 124A-N can include one or more image capture devices (e.g., visual spectrum cameras, infrared cameras, or any other suitable image capture devices), and the image capture devices can be used to identify an item (e.g., based on a UPC for the item or any other suitable aspect of the item).

In an embodiment, the POS system 120A can communicate with an administration system 140 using a network 130. The network 130 can be any suitable communication network, including a local area network (LAN), wide area network (WAN), cellular communication network, the Internet, or any other suitable communication network. The POS system 122A can communicate with the network 130 using any suitable network connection, including a wired connection (e.g., an Ethernet connection), a WiFi connection (e.g., an 802.11 connection), or a cellular connection.

In an embodiment, the POS system 120A can communicate with the administration system 140 to identify items scanned by a purchaser 102, and to perform other functions relating to self-checkout. The administration system 140 is discussed further, below, with regard to FIG. 2. In an embodiment, the POS system 120A can use the administration system 140 to identify an item (e.g., using the scanner 122, sensors 124A-N, or any combination thereof).

For example, the POS system 120A can capture information using sensors 124A-N, and can use computer vision to identify and predict issues relating to the item, and to present instructions (e.g., to a purchaser 102, an employee at an employee station 126, or any other suitable human entity or automated system). This is discussed further, below, with regard to FIG. 3.

These issues can include a wide variety of issues. For example, in an embodiment the POS system 120A can predict issues that affect computer vision and item recognition. This can include overlapping items (e.g., where multiple items are shown for purchase and one or more items overlap with one or more other items, obscuring sensor views for item prediction), occlusion (e.g., where a sensor view is obstructed or otherwise occluded), lighting conditions (e.g., insufficient light, excessive glare, or other suitable lighting conditions), distance (e.g., items placed too far from, or too close too, sensors), sensor issues (e.g., camera malfunctions, incorrect camera orientation, or other suitable sensor issues), or any other suitable issues that affect computer vision and item recognition.

As another example, in an embodiment the POS system 120 can predict issues that affect the customer's purchases or shopping experience. This can include crumpling or tearing of a product (e.g., a product bag), spoiled or damaged items (e.g., bruised or spoiled produce), broken products, products requiring employee intervention (e.g., products requiring age verification), or any other suitable issues that affect the customer's purchases or shopping experience. As another example, in an embodiment the POS system 120 can predict issues that affect the purchase transaction. This can include identifying items that remain in a customer's arms, hands, or shopping container (e.g., shopping bag, basket, cart, or other suitable shopping container). These are merely examples, and the POS system 120A can predict a wide variety of issues.

FIG. 1 illustrates the administration system 140 connected to the checkout area 110 using the communication network 130. The administration system 140 can reply to the POS system 120A with predicted instructions (e.g., generated using a suitable ML model) to address an issue with checkout. The POS system 120A can then present the instructions to the purchaser (e.g., using text, audio instructions, video instructions, or any other suitable interface). This is merely an example, and the administration system 140 can be fully, or partially, maintained at a local computer accessible to the POS system 120A without using a network connection (e.g., maintained on the POS system 120A itself or in a local storage repository).

Further, in an embodiment, the sensors 124A-N are also components of the POS system 120A and can be used to predict an issue (e.g., using computer vision) and predict instructions to address the issue. For example, the sensors 124A-N can include an image capture device used to capture one or more images of an item a purchaser 102 is seeking to purchase. The POS system 120A can transmit the images to the administration system 140 to identify the item depicted in the images. The administration system 140 can then use one or more suitable trained ML models (e.g., a computer vision ML model and any other suitable ML model(s)) to identify the items depicted in the image, predict an issue, and predict instructions for the issue, and can reply to the POS system 120A with instructions.

For example, the administration system 140 can transmit to the POS system 120A direct instructions (e.g., audio, text, or video instructions), a code identifying pre-defined instructions (e.g., from among a corpus of available instructions), or any other suitable information. The POS system 120A can use the received information to present the instructions to the purchaser. In an embodiment, instructions are maintained at the POS system 120A. Alternatively, this information can be maintained at another suitable location. For example, the POS system 120A can communicate with any suitable storage location (e.g., a local storage location or a cloud storage location) to retrieve the information (e.g., using the identifying code for the instructions). Alternatively, or in addition, as discussed above the administration system 140 can provide the information (e.g., the instructions) to the user.

Figure 2:
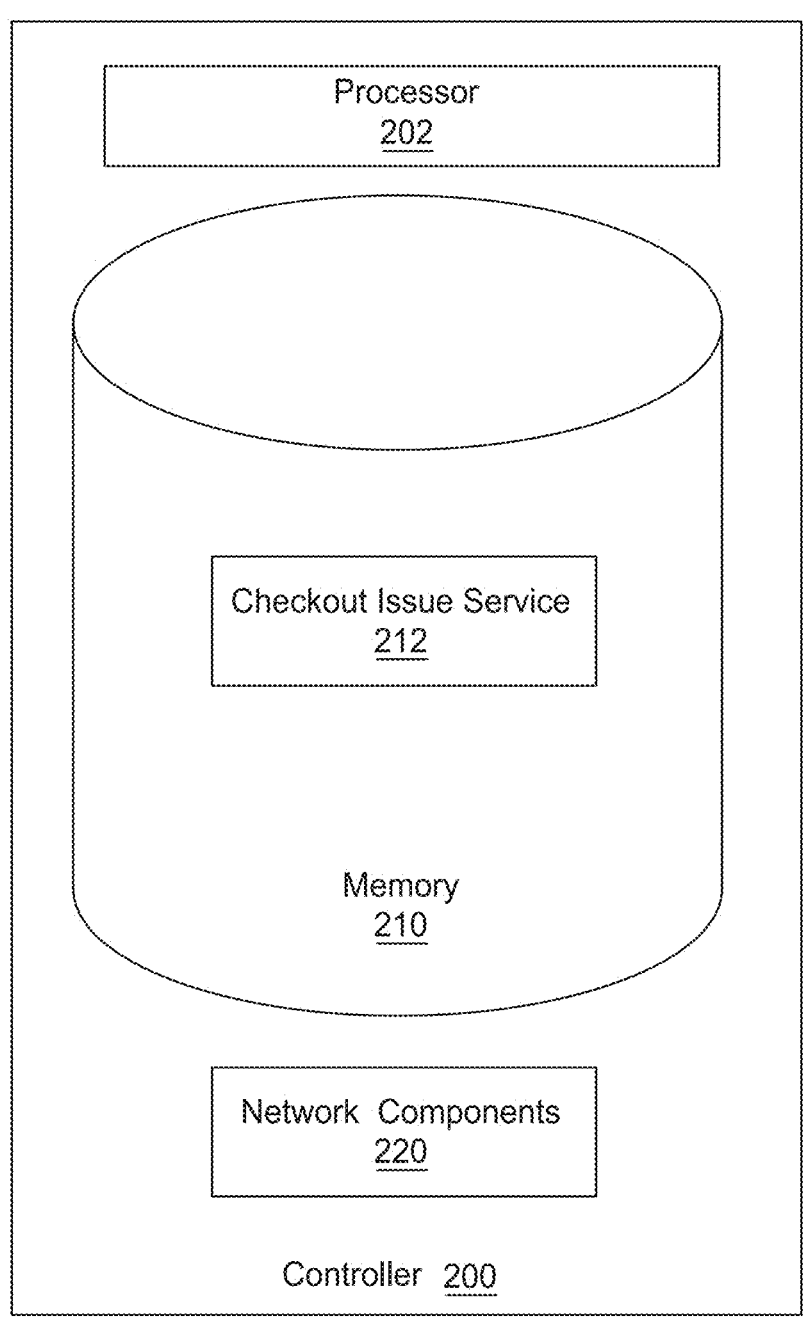
FIG. 2 is a block diagram illustrating a controller for customer assistance using computer vision item detection, according to one embodiment.

FIG. 2 is a block diagram illustrating a controller 200 for customer assistance using computer vision item detection, according to one embodiment. In an embodiment, the controller 200 is used for the administration system 140 illustrated in FIG. 1. The controller 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components for the controller 200 to interface with a suitable communication network (e.g., the communication network 130 illustrated in FIG. 1). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read-only memory (ROM), flash memory, or other types of volatile and/or non-volatile memory.

The memory 210 generally includes program code for performing various functions related to use of the controller 200. The program code is generally described as various functional "applications" or "modules" within the memory 210, although alternate implementations may have different functions and/or combinations of functions. Within the memory 210, the checkout issue service 212 facilitates customer assistance using computer vision item detection. This is discussed further, below, with regard to FIGS. 3-7.

Although FIG. 2 depicts the checkout issue service 212 as located in the memory 210, that representation is merely provided as an illustration for clarity. More generally, the controller 200 may include one or more computing platforms, such as computer servers for example, which may be co-located, separated, or may form an interactively linked but distributed system, such as a cloud-based system (e.g., a public cloud, a private cloud, a hybrid cloud, or any other suitable cloud-based system). As a result, the processor 202 and memory 210 may correspond to distributed processor and memory resources within a computing environment. Further, in an embodiment the checkout issue service 212 may be divided across any suitable number of computing systems or compute nodes (e.g., in a cloud computing system), including fully or partially integrated within POS devices.

Figures 3, 4:
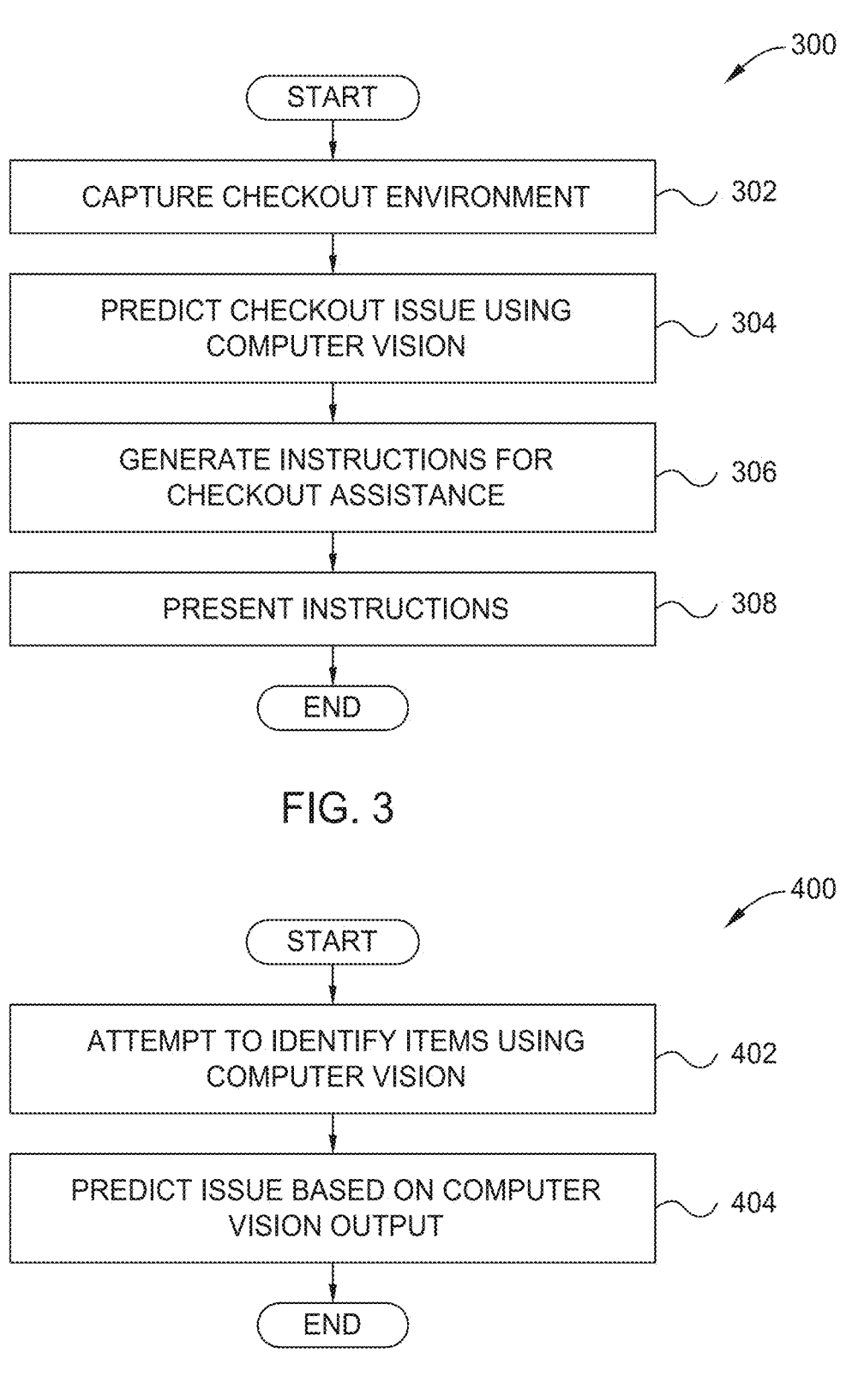
FIG. 3 is a flowchart illustrating customer assistance using computer vision item detection, according to one embodiment.
FIG. 4 is a flowchart illustrating predicting a checkout issue using computer vision, according to one embodiment.

FIG. 3 is a flowchart 300 illustrating customer assistance using computer vision item detection, according to one embodiment. At block 302, a checkout issue service (e.g., the checkout issue service 212 illustrated in FIG. 2) captures a checkout environment. For example, the checkout issue service (or any other suitable software service) can use one or more sensors (e.g., the sensors 124A-N illustrated in FIG. 1) to capture the checkout environment (e.g., the POS system 120A illustrated in FIG. 1).

At block 304, the checkout issue service predicts a checkout issue using computer vision. In an embodiment, the checkout issue service can use one or more ML models to attempt to identify items using computer vision, and to predict an issue based on the output from that attempt. This is discussed further, below, with regard to FIG. 4. For example, the checkout issue service can use a trained computer vision ML model (e.g., neural network) to attempt to identify items at the checkout environment, based on the data captured at block 302. The checkout issue service can then use another ML model (e.g., another neural network) to predict an issue based on the output from the first ML model (e.g., the computer vision ML model).

As discussed above, in an embodiment the checkout issue service predicts a checkout issue using computer vision (e.g., based on captured images or videos of the checkout area). Alternatively, or in addition, the checkout issue service uses additional sensor data to predict a checkout issue. For example, a POS system (e.g., the POS system 120A illustrated in FIG. 1) can include a scale or other non-visual sensors. The checkout issue service can use data from one or more of these sensors to predict checkout issues (e.g., in addition to, or in place of, visual data). For example, a scale can be used to identify potentially hidden items not visible in captured images or videos, and the checkout issue service can use this weight discrepancy data to identify a potential checkout issue. This is merely an example, and any suitable sensor data can be used.

At block 306, the checkout issue service generates instructions for checkout assistance. For example, the checkout issue service can use the predicted issue(s) generated at block 304 to generate, or select, suitable instructions. These can be textual instructions, audio instructions, video instructions, or any other suitable instructions. This is discussed further, below, with regard to FIG. 7.

At block 308, the checkout issue service presents the instructions. For example, the checkout issue service can provide audio, textual, or video instructions through a suitable user interface (e.g., a screen, speakers, or any other suitable user interface). This is merely an example, and the checkout issue service (or any other suitable software service) can present any suitable type of instruction.

FIG. 4 is a flowchart illustrating predicting a checkout issue using computer vision, according to one embodiment. In an embodiment, FIG. 4 corresponds with block 304 illustrated in FIG. 3. At block 402, a checkout issue service (e.g., the checkout issue service 212 illustrated in FIG. 2) attempts to identify items using computer vision.

For example, the checkout issue service can use a suitable computer vision ML model (e.g., a deep neural network (DNN), support vector machine (SVM), or any other suitable ML model) to attempt to infer items for purchase from one or more images captured by sensors. In an embodiment, where a POS kiosk includes multiple image capture devices, multiple images (e.g., captured from different angles) can be used together to predict the items for purchase.

At block 404, the checkout issue service predicts an issue based on the computer vision output. For example, at block 402 the checkout issue service (e.g., using a computer vision ML model or another suitable ML model) can output predicted items (e.g., a best-guess at predicted items) along with a confidence score or other indication of the likely accuracy of the prediction. As another example, the checkout issue service can output identified issues. For example, in addition to (or instead of) item recognition, a computer vision ML model can be trained to recognize potential checkout issues in a POS environment. The checkout issue service can use the computer vision ML model to output these potential issues, in addition to, or instead of, predicted items. The checkout issue service can then use a suitable ML model (e.g., a trained ML model) to predict the issue based on this output. This is discussed further, below, with regard to FIGS. 5-6.

For example, as discussed above in relation to FIG. 1, the checkout issue service can predict a wide variety of issues that affect computer vision and item recognition. This can include overlapping items, occlusion, lighting conditions, distance from image capture devices, sensor issues, or any other suitable issues that affect computer vision and item recognition. As another example, the checkout issue service can predict issues that affect the customer's purchases or shopping experience. This can include crumpling or tearing of a product, spoiled or damaged items, broken products, products requiring employee intervention, items that remain in a customer's arms, hands, or shopping container, or any other suitable issues that affect the customer's purchases or shopping experience. These are merely examples. Further, as noted above in relation to block 304 illustrated in FIG. 3, computer vision is merely an example, and the checkout issue service can use additional sensor data (e.g., weight data from a scale) to supplement, or replace, captured image data.

Figure 5:
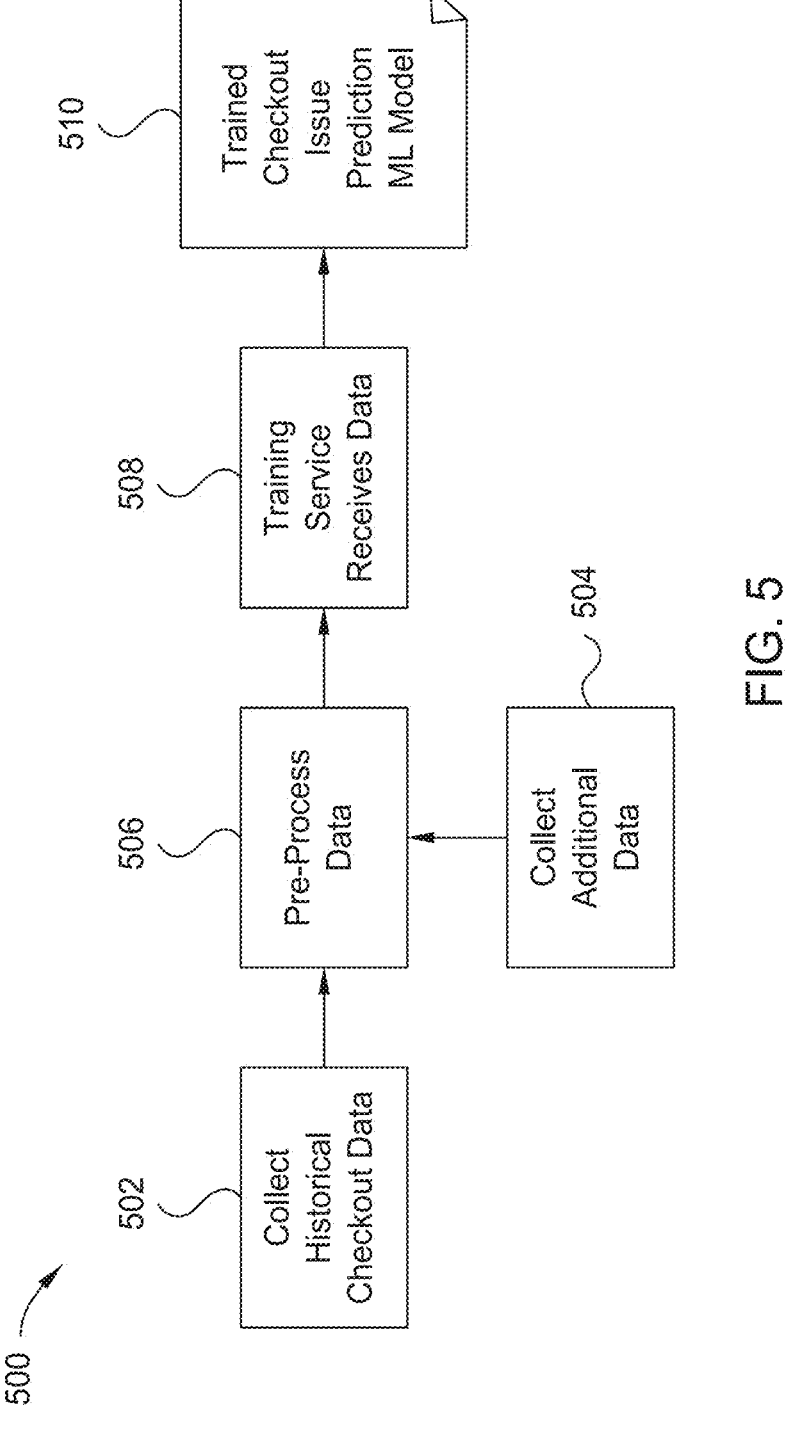
FIG. 5 is a flowchart illustrating training an ML model for predicting a checkout issue using computer vision, according to one embodiment.

FIG. 5 is a flowchart 500 illustrating training an ML model for predicting a checkout issue using computer vision, according to one embodiment. This is merely an example, and in an embodiment a suitable unsupervised technique could be used (e.g., without requiring training). At block 502, a training service (e.g., a human administrator or a software or hardware service) collects historical checkout data. For example, a checkout issue service (e.g., the check-out issue service 212 illustrated in FIG. 2) can be configured to act as a training service, and can collect historical data reflecting customer checkouts. In an embodiment, the his-torical data includes predicted items and confidence score (e.g., output by a computer vision ML model, as discussed above in relation to FIG. 4), along with identified issues corresponding the predicted items and confidence score. Alternatively, or in addition, the historical data includes labeled image data reflecting checkout issues. These are merely examples, and any suitable historical checkout data, or other training data, can be used.

At block 506, the training service (or other suitable service) pre-processes the collected historical checkout data. For example, the training service can create feature vectors reflecting the values of various features, for historical check-out data. At block 508, the training service receives the feature vectors and uses them to train a trained checkout issue prediction ML model 510.

In an embodiment, at block 504 the training service also collects additional data. For example, the training service can use UPC data, weight data, or any other suitable data to further identify products. At block 506, the training service can also pre-process this additional data. For example, the feature vectors corresponding to the historical checkout data can be further annotated using the additional data. Alterna-tively, or in addition, additional feature vectors correspond-ing to the additional product data can be created. At block 508, the training service uses the pre-processed additional data during training to generate the trained checkout issue prediction ML model 510.

In an embodiment, the pre-processing and training can be done as batch training. In this embodiment, the data is pre-processed at once (e.g., historical checkout data and additional data), and provided to the training service at block 508. Alternatively, the pre-processing and training can be done in a streaming manner. In this embodiment, the data is streaming, and is continuously pre-processed and provided to the training service. For example, it can be desirable to take a streaming approach for scalability. The set of training data may be very large, so it may be desirable to pre-process the data, and provide it to the training service, in a streaming manner (e.g., to avoid computation and storage limitations). Further, in an embodiment, a federated learning approach could be used in which multiple entities contribute to training a shared model.

Figure 6:
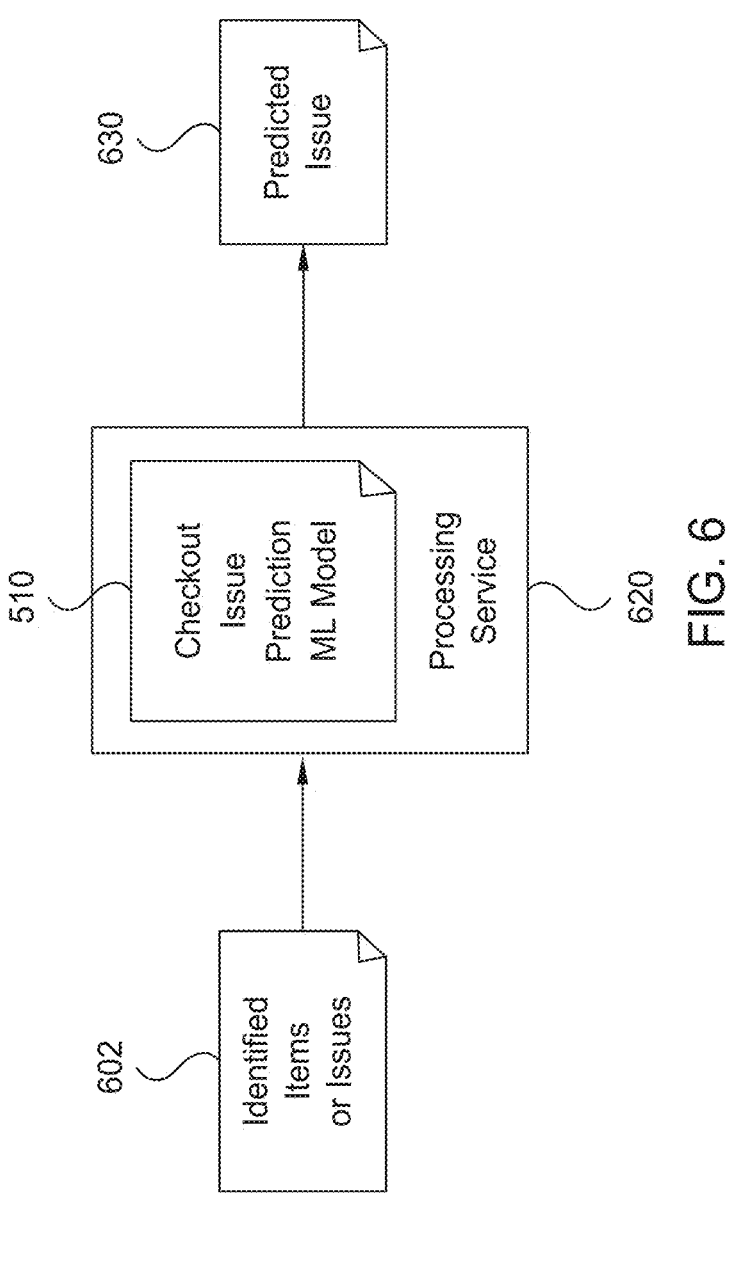
FIG. 6 is a flowchart illustrating inference using an ML model for predicting a checkout issue using computer vision, according to one embodiment.

FIG. 6 is a flowchart 600 illustrating inference using an ML model for predicting a checkout issue using computer vision, according to one embodiment. In an embodiment, a processing service 620 (e.g., the checkout issue service 212 illustrated in FIG. 2 or any other suitable software service) is associated with a checkout issue prediction ML model 510. In an embodiment, the checkout issue prediction ML model 510 is trained to infer a predicted issue 630 for one or more identified items or issues 602. For example, the checkout issue prediction ML model 510 can predict issues based on identified items, and confidence scores relating to the items. Alternatively, or in addition, the checkout issue prediction ML model 510 an predict issues based on iden-tified issues (e.g., issues directly identified from captured images by a computer vision ML model).

In an embodiment, the predicted issue 630 reflects a predicted issue for the identified products or issues 602. Alternatively, or in addition, the predicted issue 630 iden-tifies multiple suggested matches (e.g., a range of predicted issue). In an embodiment, the checkout issue prediction ML model 510 provides confidence scores for possible predicted issue 630, which can be factored in to the instructions generated at block 306 illustrated in FIG. 3.

Figure 7:
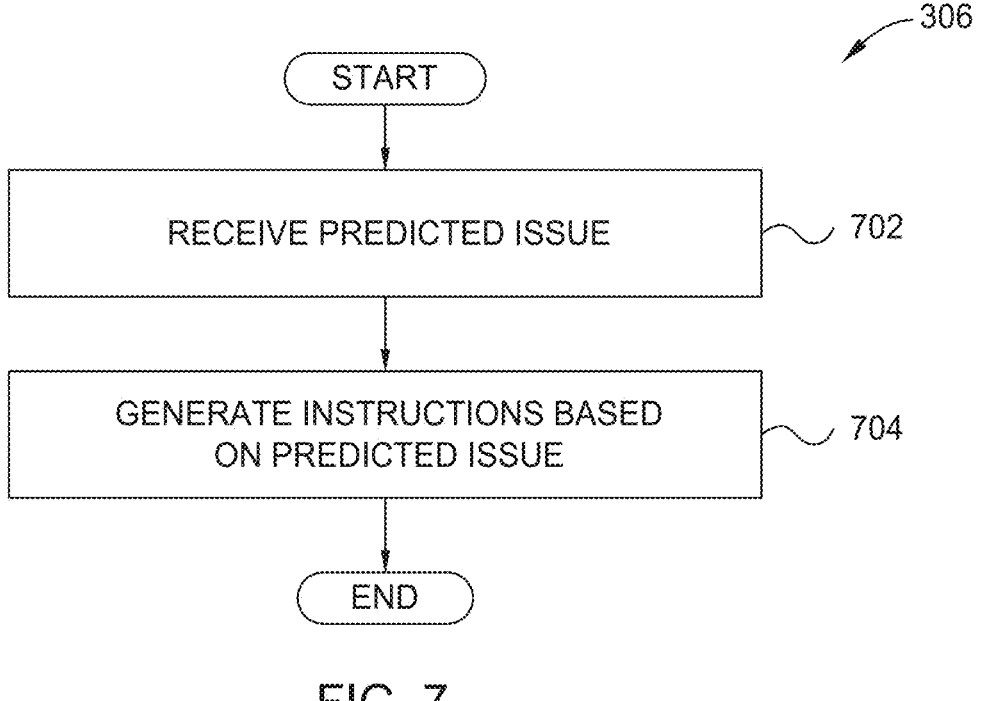
FIG. 7 is a flowchart illustrating generating instructions for checkout assistance, according to one embodiment.

FIG. 7 is a flowchart illustrating generating instructions for checkout assistance, according to one embodiment. In an embodiment, FIG. 7 corresponds with block 306 illustrated in FIG. 3. At block 702 a checkout issue service (e.g., the checkout issue service 212 illustrated in FIG. 2) receives a predicted issue. For example, the checkout issue service can receive a predicted issue generated by one or more ML models, as discussed above in relation to FIGS. 4-6.

In an embodiment, the checkout issue service receives one predicted issue (e.g., a most likely predicted issue). Alternatively, the checkout issue service receives multiple predicted issues. For example, the checkout issue service can receive a list of predicted issues. These can be ranked (e.g., based on likelihood, expected impact, or any other suitable criteria). Further, the checkout issue service can receive a score associated with the predicted issues (e.g., a confidence score generated by an ML mode). The score can indicate a likelihood that the issue has occurred, a severity of the issue, or any other suitable information.

At block 704, the checkout issue service generates instructions based on the predicted issue. In an embodiment, the checkout issue service uses the predicted issue (or issues) to generate instructions. For example, the checkout issue service can use a suitable natural language processing (NLP) ML model to generate textual or audio instructions. As another example, the checkout issue service can use a suitable ML model to generate visual instructions (e.g., an image or video containing instructions). In this example, an ML model can be trained to generate instructions from predicted issues, and the checkout issue service can use the ML model to infer instructions.

Alternatively, or in addition, the checkout service can use the predicted issue(s) to select among previously generated instructions. For example, one or more instructions can be generated for a variety of likely issues. The checkout service can use the predicted issue(s) so select among these instruc-tions.

In an embodiment, the checkout issue service can provide a wide variety of instructions using a wide variety of media (e.g., textual instructions, audio instructions, video instruc-tions, or any other suitable instruction format). For example, the checkout service can instruct a customer to move an item to improve the data available to the computer vision ML model (e.g., "Please move the 24 pack of soda toward the side of the checkout area."). These instructions can identify items (e.g., items recognized using a computer vision ML Model) and can provide real-time (or near real-time) rel-evant information to customers (e.g., where, or how, to take an action to improve the transaction.

In an embodiment, multiple ML models are used to predict checkout issues and present instructions for a user.

For example, as discussed above in relation to FIG. 3, three models could be used. A computer vision ML model could be trained for item recognition, and used to identify items in the checkout environment. A checkout issue prediction ML model (e.g., the checkout issue prediction ML model 510 illustrated in FIGS. 5-6) can predict checkout issues (e.g., based on the output from the computer vision ML model) Further, an NLP ML model, or other suitable ML model, can be used to generate instructions from the predicted checkout issue(s). But this is merely one example. In an embodiment, fewer, or more, ML models can be used. For example, one ML model could be used to infer predicted checkout issues from captured environmental sensor data (e.g., images or videos captured by cameras at checkout). That is, one ML model could receive captured data as an input and infer predicted issues, rather than two separate ML models. Further, this ML model could also be used to generate instructions. Or one or more instructions could be selected using a rules-based technique (e.g., selecting from among pre-generated instructions), without using ML for generating instructions. These are merely examples.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to the described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not an advantage is achieved by a given embodiment is not limiting of the scope of the present disclosure. Thus, the preceding aspects, features, embodiments and advantages are merely illustrative and are not considered elements or limitations of the appended claims except where explicitly recited in a claim (s). Likewise, reference to "the disclosure" shall not be construed as a generalization of any inventive subject matter disclosed herein and shall not be considered to be an element or limitation of the appended claims except where explicitly recited in a claim(s).

Aspects of the described embodiments may take the form of an entirely hardware embodiment, an entirely software embodiment (including firmware, resident software, micro-code, etc.) or an embodiment combining software and hardware aspects that may generally be referred to herein as a "circuit," "module" or "system."

One or more of the described embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the described embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the described embodiments.

Aspects of the described embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a described manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged for the computing resources actually used (e.g. an amount of storage space consumed by a user or a number of virtualized systems instantiated by the user). A user can access any of the resources that reside in the cloud at any time, and from anywhere across the Internet. In context of the described embodiments, a user may access applications (e.g., the checkout issue service 212 illustrated in FIG. 2) or related data available in the cloud. For example, the checkout issue service, or any aspect of the checkout issue service, could execute on a computing system in the cloud and predict checkout issues and generate corresponding instructions. Further, suitable ML models, and associated data, could be stored at a storage location in the cloud. Doing so allows a user to access this information from any computing system attached to a network connected to the cloud (e.g., the Internet).

While the foregoing is directed to one or more embodiments, other and further embodiments may be devised without departing from the basic scope thereof, and the scope thereof is determined by the claims that follow.

What is claimed is:

1. A method comprising:
identifying one or more images, captured at a point of sale (POS) system, of one or more items for purchase;
receiving discrepancy weight data, captured at the POS system, associated with the one or more items for purchase;
predicting a checkout issue relating to the one or more items for purchase, comprising:
determining the checkout issue using a trained machine learning (ML) model, based on the one or more images, comprising:
generating a feature vector for discrepancy weight data and each trained one or more images of the items for purchase;
compressing the feature vector for the discrepancy weight data each of the trained one or more images into a vector data stream;
streaming the vector data stream into the computer vision ML model;
generating a first output at a computer vision ML model trained to recognize items for purchase, based on streaming the vector data stream into the computer vision ML model;
predicting the checkout issue by streaming the first output to the trained ML model, wherein the trained ML model is different from the computer vision ML model;
generating one or more instructions for a purchaser of the one or more items, based on the predicted checkout issue; and
generating a user interface at the POS system, wherein the user interface includes graphical elements comprising the one or more instructions.

2. The method of claim 1, wherein the generating one or more instructions for the purchaser of the one or more items, based on the predicted checkout issue, comprises:
determining the instructions using a natural language processing (NLP) ML model, based on providing the predicted checkout issue to the NLP ML model.

3. The method of claim 2, wherein the one or more instructions comprise instructions to improve accuracy of identifying the one or more items for purchase using the computer vision ML model.

4. The method of claim 1, wherein determining the checkout issue using the trained ML model, based on the one or more images, comprises:

predicting the checkout issue by providing the one or more images to the trained ML model, wherein the trained ML model outputs the predicted checkout issue.

5. The method of claim 4, wherein the generating one or more instructions for the purchaser of the one or more items, based on the predicted checkout issue, comprises:

determining the instructions using a natural language processing (NLP) ML model, based on providing the predicted checkout issue to the NLP ML model.

6. The method of claim 5, wherein the one or more instructions comprise instructions to improve accuracy of identifying the one or more items for purchase using a computer vision ML model.

7. The method of claim 1, wherein predicting the checkout issue relating to the one or more items for purchase is based on weight data captured using a scale, in addition to the one or more images.

8. The method of claim 1, wherein the computer vision ML model and the trained ML model comprise neural networks, deep neural networks, or a support vector machine.

9. The method of claim 1, wherein the first output comprises confidence scores relating to identified items.

10. The method of claim 1, wherein the one or more instructions for a purchaser of the one or more items, are based on confidence scores provided by the trained ML model in addition to the predicted checkout issue.

11. A non-transitory computer program product comprising:

one or more non-transitory computer readable media containing, in any combination, computer program code that, when executed by operation of any combination of one or more processors, performs operations comprising:

identifying one or more images, captured at a point of sale (POS) system, of one or more items for purchase;

receiving discrepancy weight data, captured at the POS system, associated with the one or more items for purchase;

predicting a checkout issue relating to the one or more items for purchase, comprising:

determining the checkout issue using a trained machine learning (ML) model, based on the one or more images, comprising:

generating a feature vector for discrepancy weight data and each trained one or more images of the items for purchase;

compressing the feature vector for the discrepancy weight data each of the trained one or more images into a vector data stream;

streaming the vector data stream into the computer vision ML model;

generating a first output at a computer vision ML model trained to recognize items for purchase, based on streaming the vector data stream into the computer vision ML model;

predicting the checkout issue by streaming the first output to the trained ML model, wherein the trained ML model is different from the computer vision ML model;

generating one or more instructions for a purchaser of the one or more items, based on the predicted checkout issue; and generating a user interface at the POS system, wherein the user interface includes graphical elements comprising the one or more instructions.

12. The non-transitory computer program product of claim 11, wherein the one or more instructions comprise instructions to improve accuracy of identifying the one or more items for purchase using the computer vision ML model.

13. The non-transitory computer program product of claim 11, wherein determining the checkout issue using the trained ML model, based on the one or more images, comprises:

predicting the checkout issue by providing the one or more images to the trained ML model, wherein the trained ML model outputs the predicted checkout issue.

14. The non-transitory computer program product of claim 13, wherein the generating one or more instructions for the purchaser of the one or more items, based on the predicted checkout issue, comprises:

determining the instructions using a natural language processing (NLP) ML model, based on providing the predicted checkout issue to the NLP ML model, wherein the one or more instructions comprise instructions to improve accuracy of identifying the one or more items for purchase using a computer vision ML model.

15. The non-transitory computer program product of claim 11, wherein the computer vision ML model and the trained ML model comprise neural networks, deep neural networks, or a support vector machine.

16. A system, comprising:

one or more processors; and one or more memories storing a program, which, when executed on any combination of the one or more processors, performs operations, the operations comprising:

identifying one or more images, captured at a point of sale (POS) system, of one or more items for purchase;

receiving discrepancy weight data, captured at the POS system, associated with the one or more items for purchase;

predicting a checkout issue relating to the one or more items for purchase, comprising:

determining the checkout issue using a trained machine learning (ML) model, based on the one or more images, comprising:

generating a feature vector for discrepancy weight data and each trained one or more images of the items for purchase;

compressing the feature vector for the discrepancy weight data each of the trained one or more images into a vector data stream;

streaming the vector data stream into the computer vision ML model;

generating a first output at a computer vision ML model trained to recognize items for purchase, based on streaming the vector data stream into the computer vision ML model;

predicting the checkout issue by streaming the first output to the trained ML model, wherein the trained ML model is different from the computer vision ML model;

generating one or more instructions for a purchaser of the one or more items, based on the predicted checkout issue; and generating a user interface at the POS system, wherein the user interface includes graphical elements comprising the one or more instructions.

17. The system of claim 16 wherein the one or more instructions comprise instructions to improve accuracy of identifying the one or more items for purchase using the computer vision ML model.

18. The system of claim 16, wherein determining the checkout issue using the trained ML model, based on the one or more images, comprises:

predicting the checkout issue by providing the one or more images to the trained ML model, wherein the trained ML model outputs the predicted checkout issue.

19. The system of claim 18, wherein the generating one or more instructions for the purchaser of the one or more items, based on the predicted checkout issue, comprises:

determining the instructions using a natural language processing (NLP) ML model, based on providing the predicted checkout issue to the NLP ML model, wherein the one or more instructions comprise instructions to improve accuracy of identifying the one or more items for purchase using a computer vision ML model.

20. The system of claim 16, wherein the computer vision ML model and the trained ML model comprise neural networks, deep neural networks, or a support vector machine.

\* \* \* \* \*